April 24, 1934. G. S. GOODWIN ET AL 1,956,348
BOLT AND NUT LOCKING DEVICE AND THE PROCESS OF MAKING
Filed Dec. 2, 1929
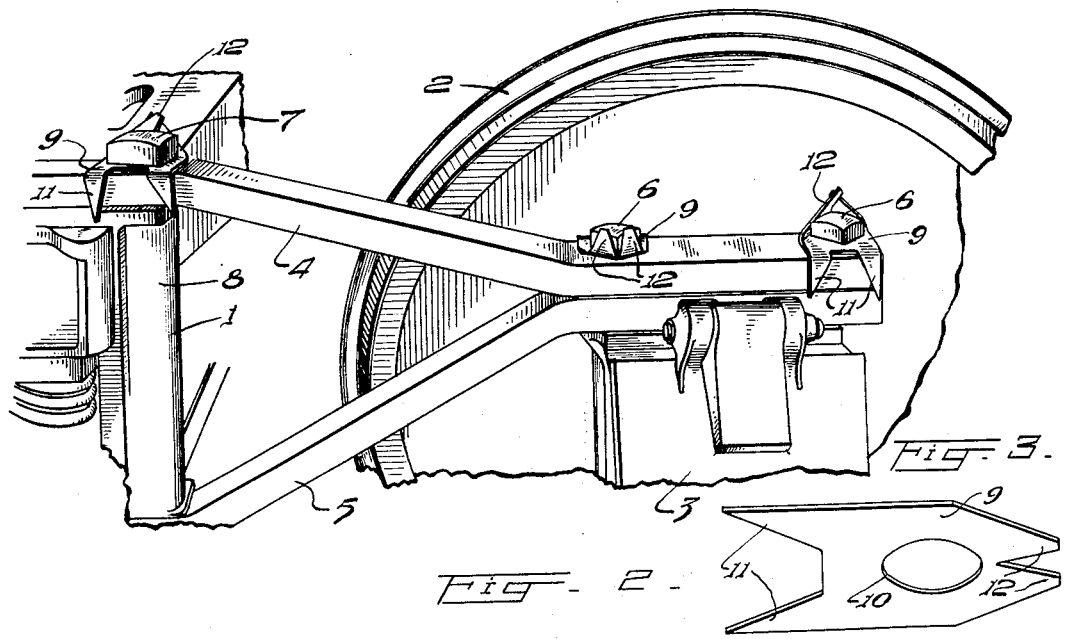
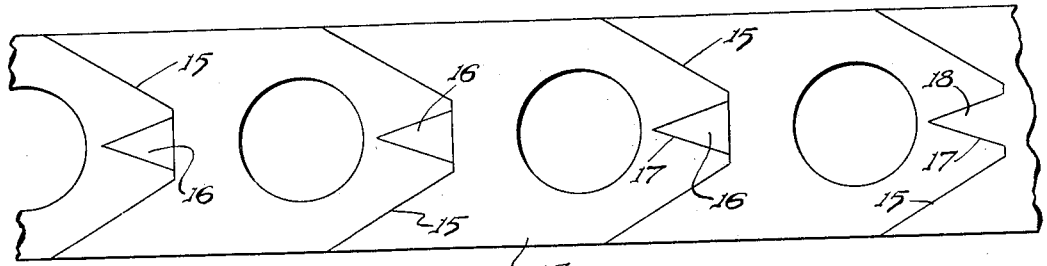
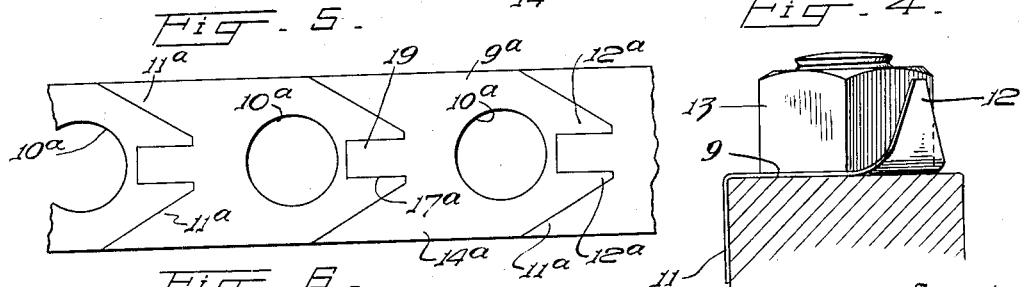
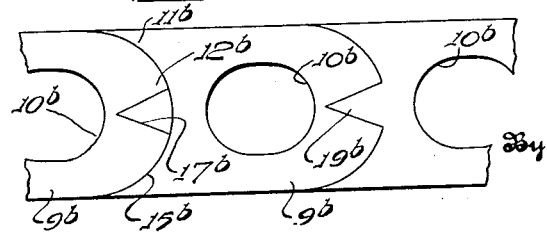
Inventor
George S. Goodwin
Peter Kass
By Towson Price
Attorney Patented Apr. 24, 1934

1,956,348

UNITED STATES PATENT OFFICE 1,956,348

BOLT AND NUT LOCKING DEVICE AND THE PROCESS OF MAKING

George S. Goodwin and Peter Kass, Chicago, Ill.

Application December 2, 1929, Serial No. 411,119

5 Claims. (Cl. 10—73)

This invention relates to bolt and nut locking devices and the process of making them.

The principal object of our invention, generally considered, is the economical manufacture of washers having prongs, some of which are adapted to engage a nut or bolt head and others of which are adapted to engage a device with which said nut or bolt is used.

Another object of our invention is to provide in combination with a bolt head or nut, a washer having bendable tangs, some of which are adapted to engage the bolt or nut and others the object with which the bolt or nut is used for preventing turning.

A further object of our invention is the provision of a locking washer formed with a bolt receiving aperture and two pairs of tangs or prongs extending in opposite directions, one pair of said tangs being spaced close to the aperture and to one another and the other pair being more widely spaced with respect to the aperture and to one another.

A still further object of our invention is to improve the manufacture of locking washers, whereby the formation of scrap is minimized, said washers being formed with bolt receiving apertures and with a pair of prongs at each end thereof, the prongs at one end being more widely spaced than those at the other, whereby the widely spaced prongs are adapted to receive therebetween the closely spaced prongs of an adjacent washer, so that in cutting such washers from a strip of metal, the prongs at one end of one washer are cut at the same time as the complementary prongs at the other end of an adjacent washer.

Other objects and advantages of the invention relating to the particular arrangement and construction of the various parts will become apparent as the description proceeds.

Referring to the drawing illustrating our invention, the scope whereof is defined by the appended claims.

Figure 1 is a fragmentary perspective view of a railway truck showing arch bar column and journal box bolts with washers, embodying our invention, applied thereon.

Figure 2 is a view of a portion of a strip of metal illustrating the manner of cutting to produce our locking washers.

Figure 3 is a perspective view of one of our washers.

Figure 4 is a fragmentary view of a bolt with washer and nut illustrating the manner of using our washer for locking nuts in place.

Figures 5 and 6 are views corresponding to Figure 2, but showing modifications.

In accordance with the requirements of the American Railway Association, all arch bar trucks in use are required to have the bolts thereof equipped with washers that will prevent turning thereof. In order to accomplish this, it is necessary to have a washer, portions of which are adapted to engage the head of the bolt and other portions of which are adapted to engage the associated arch bar or device with which the bolt is used. In accordance with our invention we have produced such washers which not only fulfill the requirements, but are adapted for locking nuts and for manufacture at small cost and with the reduction of scrap to a very low proportion.

Referring to the drawing in detail, like parts being designated by like reference characters, and first considering the embodiment of our invention illustrated in Figures 1 to 4 inclusive, we have shown in Figure 1 a portion of a truck 1 having wheels 2, journal boxes 3, top structural members or arch bars 4, and bottom structural members or arch bars 5. Journal box bolts 6 are used for connecting the journal boxes to the arch bars, and column bolts 7 are used for connecting the guide columns 8 to the arch bars 4 and 5. Although the lower ends of the bolts 6 and 7 are not shown, it will be understood that they are provided with nuts as is usual.

In order to prevent turning of the bolts 6 and 7, we provide washers 9 formed with preferably circular apertures 10, adapted to receive standard or normal bolts, and two pairs of prongs 11 and 12 respectively. It will be seen that the prongs 11 are more widely spaced than the prongs 12 and are also spaced a greater distance from the bolt hole 10 than are the prongs 12. The reason for this construction is that the prongs or tangs 12 are adapted to be bent up into engagement with the head of the bolt, which, as is usual, preferably has a plurality of angularly disposed flat side faces, or if used in connection with a nut 13, also preferably formed with angularly disposed flat side faces, as shown in Figure 4, into engagement with said nut, or, more specifically, into engagement with one or a pair of adjacent flat side faces, depending on the position of the bolt or nut relative to the associated washer, while the prongs 11 are adapted to be bent down into engagement with the associated arch bar, tie member, or other device with which the bolt or nut is used.

In order to economize on material and produce a locking washer or nut lock that is economical to manufacture and permits a saving in scrap, the washers are preferably cut out as illustrated in Figure 2, that is, the strip of metal 14 is cut along broken lines 15 so that the prongs 11 on one washer are cut out simultaneously with the outlining of the prongs 12 on the adjacent washer, the triangular piece of metal 16 between one end of one washer and the prongs 12 of the adjacent washer being simultaneously or subsequently cut out with the formation of the only scrap, if we do not count the scrap produced when the bolt holes 10 are formed in the washer. It will also be understood that the piece of metal 16 may be left in place, if desired, but for greater convenience in locking nuts or bolts in any position is notched out, thus especially facilitating the locking of a nut or bolt head when it stands at an angle, as in Figures 1 and 4. Even when the sides of the nut or bolt head are parallel with the edge of the arch bar or other device to which applied, the notch 17 is recommended for greater ease in bending to locked position, although not needed. If desired the cut between the washers may be in the shape of a W, thus producing the tangs 11, 12 and notch 17 in a single operation, leaving a central tang 18 on the opposite end of the adjacent washer.

Referring now to the embodiment of our invention illustrated in Figure 5, another form of washer 9$^a$ and the method of cutting it from a strip of metal 14$^a$ is illustrated. The only difference in the present embodiment over the previous embodiment is that the washers are cut apart along diagonal, longitudinal and transverse lines leaving tangs 12$^a$ spaced by a rectangular notch 17$^a$ on one end of each washer and outer tangs 11$^a$ with a central tang 19 on the other end of each washer. In this way all scrap is avoided except that formed when the bolt receiving aperture 10$^a$ is cut out.

Referring now to the embodiment of our invention illustrated in Figure 6, another design is shown in which the individual washers 9$^b$ are cut apart along curved or curved and diagonal lines 15$^b$, leaving tangs 11$^b$ at one end with or without a central tang or prong 19$^b$, and tangs 12$^b$ at the other end, either with a notch 17$^b$ spacing them or uncut, as desired. The bolt receiving aperture 10$^b$ may be circular as in previous embodiments or elongated as illustrated to allow for transverse adjustment on the arch bar or other device with which used, so that the most efficient position with respect to the bolt may be obtained to secure the locking action desired. It will also be understood that the previous embodiments may be formed with elongated rather than circular bolt receiving holes, if desired.

From the foregoing it will be seen that we have invented an improved nut lock or locking washer which may be economically cut from a strip of metal, the line of cut being preferably broken, shaped as a W, or extended first diagonally in one direction then transversely and then diagonally in the other direction so that tapering prongs are formed on one washer simultaneously with the formation of complementary prongs on an adjacent washer. It will, of course, be understood that the more closely spaced prongs may be cut apart either simultaneously with or subsequently to the formation of the more widely spaced prongs on the adjacent washer, or left uncut, as desired. It will also be clear that the more closely spaced prongs and those spaced more closely to the bolt hole are adapted to engage the bolt or nut while the other prongs are adapted to engage the arch bar or other device with which the bolt or nut is used. In this way the more widely spaced prongs are of such a length that they may be bent down over arch bars of trucks from the widest to the narrowest and the bolt hole is preferably of such a diameter to provide for bolts from the largest to the smallest size which are used in this connection. The bolt hole may, if desired, be elongated to allow for adjustment with respect to the bolt. On account of the journal box bolts being generally smaller than the arch bar column bolts, it may be desirable to make the washers in two sizes, one size adapted to take the largest journal box bolt and the other the largest column bolt with prongs adapted to be bent down when used with six inch arch bars and smaller.

Although we have described preferred embodiments of our invention as used with arch bar trucks, it will be understood that our washers may be used with any type of bolt and nut in any connection and the showing is merely illustrative as modifications may be made within the spirit and scope of our invention as defined by the appended claims.

Having now described our invention, we claim:

1. A locking washer comprising an apertured plate having a pair of prongs disposed close to said aperture and close to one another, and another pair of prongs extending in the opposite direction and more distantly spaced from said aperture and from one another.

2. The method of making locking devices comprising perforating and cutting a strip of metal diagonally in two directions at spaced intervals to form washers with diverging spaced prongs at one end and complementary closely disposed prongs at the other end.

3. The method of making locking devices comprising perforating and making W shaped cuts across a strip of metal at spaced intervals to form washers with diverging prongs spaced by an intermediate prong at one end and complementary prongs at the other end.

4. The method of making locking devices comprising perforating and cutting a strip of metal in two directions, longitudinally and diagonally between said perforations to form transversely washers with three prongs at one end and complementary prongs at the other end.

5. The method of manufacturing washers comprising cutting a strip of metal along broken lines which first extend diagonally in one direction then transversely of the metal and then diagonally in the other direction, whereby spaced prongs are formed at one end of the washers and a blunt portion fitting between said prongs is formed at the other end of said washers, and bifurcating said blunt portion by cutting out a triangular notch to form more closely spaced prongs.

GEORGE S. GOODWIN.
PETER KASS.